United States Patent [19]

Kato

[11] Patent Number: 5,281,081
[45] Date of Patent: Jan. 25, 1994

[54] STOWAGE DEVICE FOR PLURAL SPECIES OF WORKS

[75] Inventor: Hisao Kato, Inazawa, Japan

[73] Assignee: Mitsubishi Denki Kabushiki Kaisha, Tokyo, Japan

[21] Appl. No.: 988,024

[22] Filed: Dec. 9, 1992

Related U.S. Application Data

[63] Continuation of Ser. No. 639,233, Jan. 9, 1991, abandoned.

[30] Foreign Application Priority Data

Jan. 10, 1990 [JP] Japan ..................................... 2-2854

[51] Int. Cl.[5] ............................................. B65G 57/24
[52] U.S. Cl. ............................. 414/789.6; 414/791.6; 414/902; 901/7
[58] Field of Search .................. 414/789.6, 791.6, 902; 198/347.2, 347.3; 901/7

[56] References Cited

U.S. PATENT DOCUMENTS

| 4,641,271 | 3/1987 | Konishi et al. ................. 414/902 X |
| 4,692,876 | 9/1887 | Tenma et al. ................. 414/791.6 X |
| 4,850,783 | 7/1989 | Maekawa ......................... 414/792.9 |

FOREIGN PATENT DOCUMENTS

| 248782 | 8/1987 | Fed. Rep. of Germany ... 414/789.6 |
| 3814101 | 11/1988 | Fed. Rep. of Germany ...... 414/902 |
| 61-33426 | 2/1986 | Japan . |
| 61-183019 | 8/1986 | Japan . |
| 1-275309 | 11/1989 | Japan ............................. 414/789.6 |
| 1-275310 | 11/1989 | Japan . |

*Primary Examiner*—Michael S. Huppert
*Assistant Examiner*—Janice Krizek
*Attorney, Agent, or Firm*—Leydig, Voit & Mayer

[57] ABSTRACT

A stowage device for stowing workpieces of a plurality of kinds on pallets in accordance with inputted shipment information includes a supply conveyor system provided with a refuge track conveyor. A plurality of carrier means devices (e.g. containers) carrying workpieces of different kinds are supplied via the supply conveyor system. Pallets on which workpieces are stowed by an industrial robot are transferred via a transfer device. The stowing of workpieces on each pallet is effected in two cycles: In the first cycle, workpieces of each kind filling a complete layer or layers of workpieces on the pallet are stowed. In the second re-stowing cycle, remaining fractional numbers of workpieces of respective kinds are stowed on the pallet. During these stowing operations, the carrier devices may be temporarily taken into the refuge conveyor before being transferred away from the robot.

4 Claims, 4 Drawing Sheets

STOWAGE DEVICE FOR PLURAL SPECIES OF WORKS

This application is a continuation of application Ser. No. 07/639,233, filed Jan. 9, 1991, now abandoned.

BACKGROUND OF THE INVENTION

This invention relates to stowage devices for stowing on pallets, etc., workpieces or articles for shipment, etc., wherein the number of workpieces of each kind stowed on a pallet is determined in accordance with shipment information.

As disclosed, for example, in Japanese Patent Application Laid-Open (Kokai) No. 61-33426, a stowage system is known in which after stowing schedules are automatically formed by a scheduling device in accordance with arbitrarily given dimensions of articles of a plurality of kinds, articles of respective kinds are marshaled and then stowed by an industrial robot on pallets in accordance with the stowing schedule. The number of articles of respective kinds stowed on each pallet is determined in accordance with shipment information, etc. The system is in need of a separate marshaling device for marshaling beforehand the stowed articles, in addition to a supply and a stowage device of the articles.

Such a conventional stowing system, however, still has the following disadvantages. First, the system is complicated and incurs much installation cost. Second, it is difficult to realize a higher speed of stowage. Third, the system is in need of a wide open space for the stowage. Fourth, the stowing of a fractional number of articles of respective kinds may result in an un-balanced and unstable form of the stowed articles on the pallets, and the stowing operations may be troublesome.

SUMMARY OF THE INVENTION

It is therefore an object of this invention to provide a stowage device which although simple in its organization is capable of stowing on pallets a number of articles or workpieces of a plurality of kinds with high efficiency in accordance with given shipment information, etc.

The above object is accomplished in accordance with the principle of this invention by a stowage device which comprises: supply means for forwarding a plurality of carrier means each carrying workpieces of respective kinds; transfer means for forwarding a plurality of carrier means each carrying workpieces of a plurality of kinds; an industrial robot for picking up workpieces from said carrier means forwarded by said supply means and for stowing the picked up workpieces on a pallet forwarded by said transfer means; input means for inputting shipment information with respect to kinds of workpieces, numbers of workpieces of respective kinds, and order of stowing operations with respect to each pallet; a stowage command device for commanding to said industrial robot kinds of workpieces, numbers of workpieces of respective kinds, and order of stowing operations in accordance with the inputted shipment information, wherein said order of stowing operations includes a first main stowing cycle and a second re-stowing cycle; and a supply command device for commanding said supply means to forward respective accommodation means to a predetermined position with respect to said industrial robot in accordance with said order of stowing operations commanded by said stowage command means.

Preferably, the order of stowing operations includes: a first stowing cycle in which a complete layer or layers of workpieces of respective kinds are stowed on each pallet; and a second re-stowing cycle in which remaining fractional numbers of workpieces stowed on the pallet in said first stowing cycle. Further, it is preferred that the supply means comprises a conveyor system which includes: a main conveyor for forwarding said carrier means to said industrial robot; a discharge conveyor coupled to an end of said main conveyor for transferring said carrier means away from said industrial robot; and a refuge track conveyor disposed in an operational range of said industrial robot and coupled to said end of the main conveyor, for temporarily taking thereinto said carrier means before said carrier means are transferred away via said discharge conveyor. Alternatively, the supply means is preferred to comprise a circulation conveyor system via which said plurality of carrier means are circulated in a circular path.

BRIEF DESCRIPTION OF THE DRAWINGS

The novel features which are believed to be characteristic of this invention are set forth with particularity in the appended claims. This invention itself, however, both as to its organization and method of operations, together with further objects and advantages thereof, may best be understood from the detailed description of the preferred embodiments, taken in connection with the accompanying drawings, in which:

In the drawings, like reference numerals represent like or corresponding parts.

DETAILED DESCRIPTION OF THE PREFERRED EMBODIMENTS

Referring now to the accompanying drawings, preferred embodiments of this invention are described.

Figure 1:
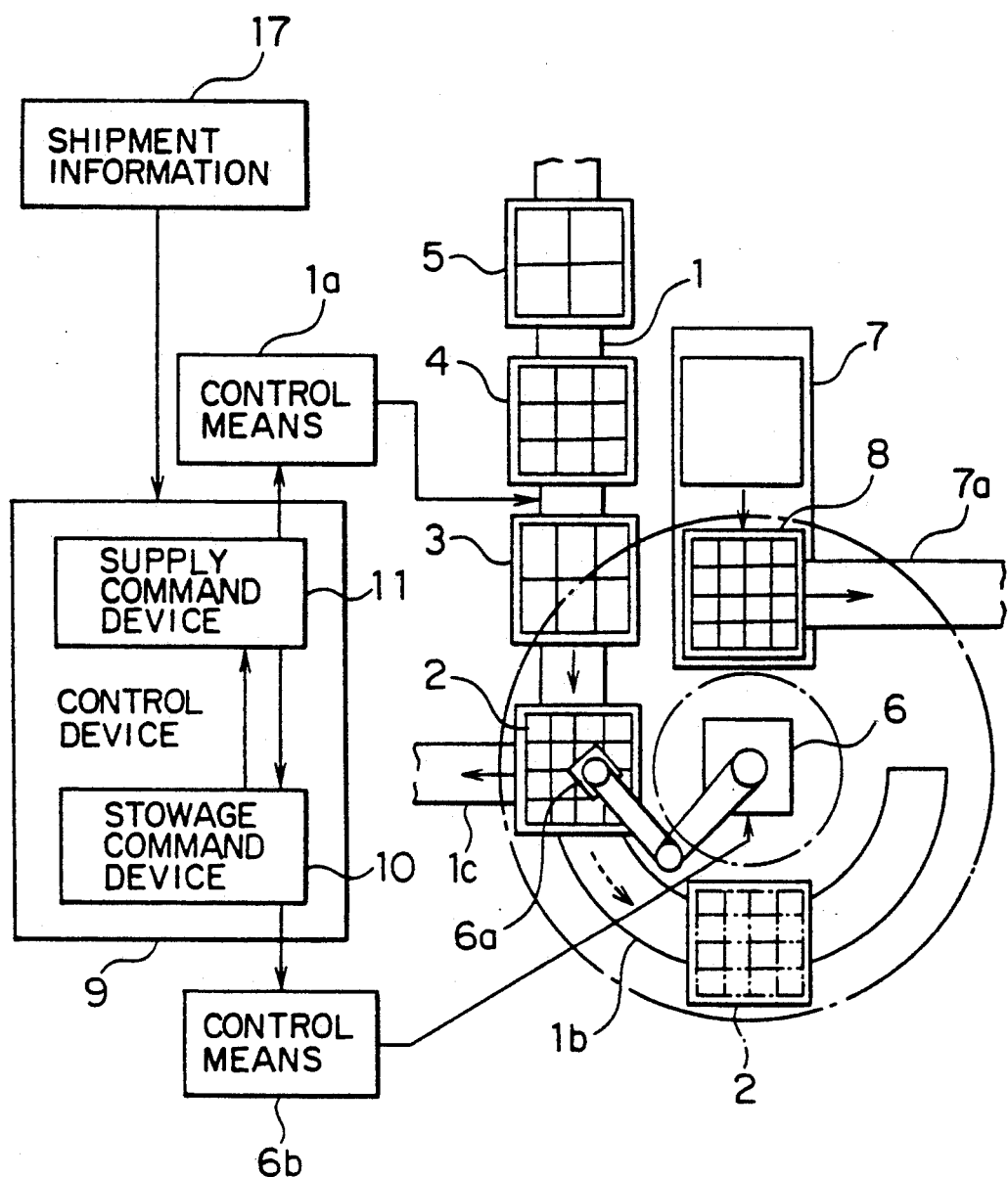
FIG. 1 is a schematic diagram showing the overall organization of a stowage device according to this invention, wherein the right half of the figure shows a schematic top view of the mechanical organization thereof.
Figure 2:
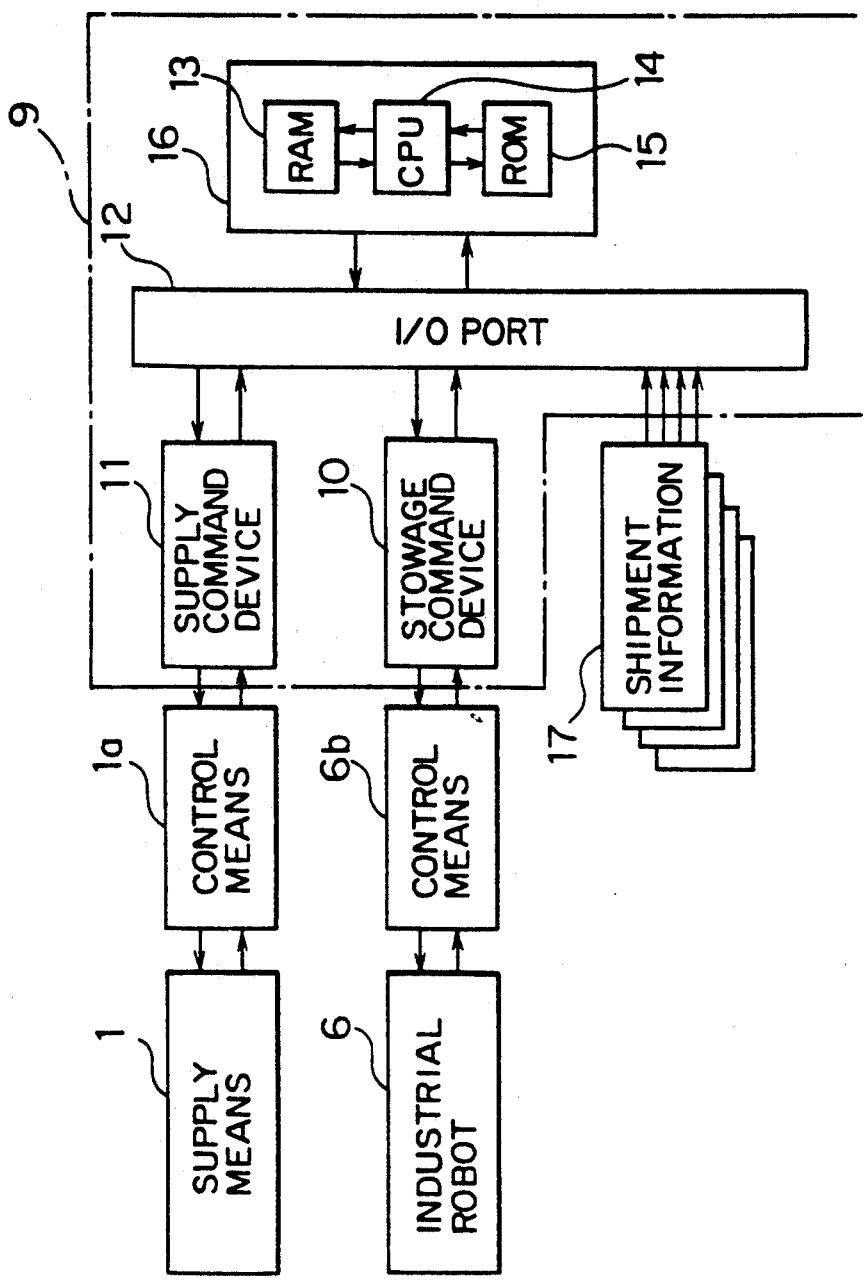
FIG. 2 is a block diagram showing the details of the control device of the stowage device of FIG. 1.
Figure 3:
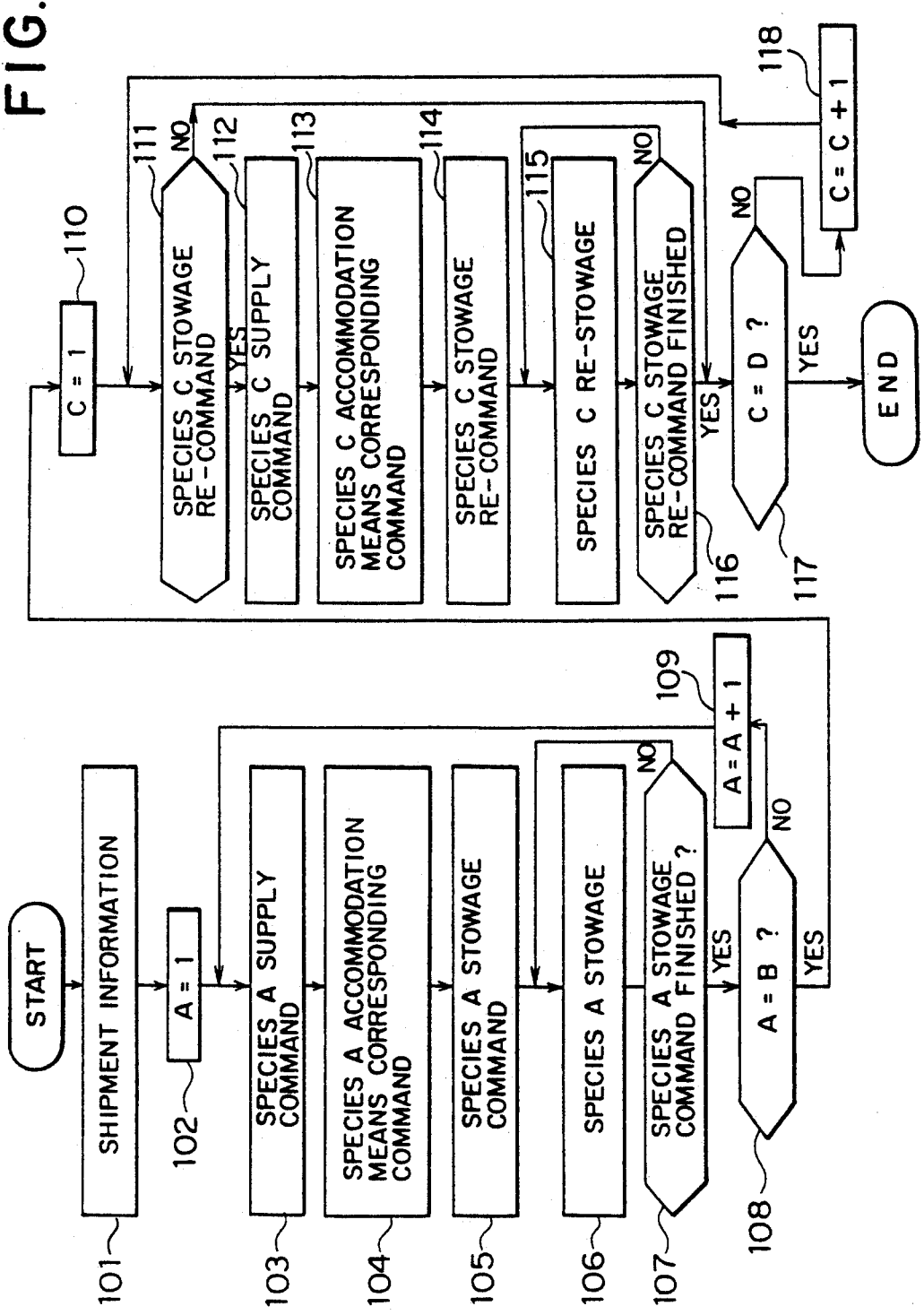
FIG. 3 is a flowchart showing the sequence of the stowing operations followed by the device of FIG. 1.

FIGS. 1 through 3 show a first embodiment of this invention. First, the overall mechanical organization of the stowage device is described. In FIG. 1, a supply means 1, consisting of a conveyor system and controlled by a control means 1a, is provided with a refuge track conveyor 1b and a discharge conveyor 1c, both coupled to the end of the main supply conveyor of the system. A plurality of receiver means (containers) 2 through 5 accommodate different kinds of workpieces or articles (referred to hereinafter as workpieces). Thus, in the following it is assumed that the first, second, third, and fourth carrier means 2, 3, 4, and 5 accommodate workpieces of a first, second, third, and fourth kind, respectively. As described in detail hereinbelow, the carrier means 2 through 5 which are forwarded downward in FIG. 1 via the supply means 1 and which may temporarily be taken into the refuge conveyor 1b, are discharged via the discharge conveyor 1c. An industrial robot 6, controlled by a control means 6b and provided with a hand 6a having an operational region indicated by two concentric circles, picks up workpieces from the carrier means 2 through 5 and stows them on pallets 8 supplied via a transfer device 7. The transfer device 7 consists of a conveyor and is provided with a discharge mechanism 7a. After the stowage is completed by the industrial robot 6, the pallet 8 is discharged via the discharge mechanism 7a.

As shown in greater detail in FIG. 2, a control device 9 includes: a stowage command device 10 for commanding the stowage operation of the industrial robot 6, a supply command device 11 which commands the supply means 1 to transfer the carrier means 2 through 5 at a predetermined position near to the industrial robot 6, and a computer 16 coupled to the stowage command device 10 and the supply command device 11 via an I/O port 12. The computer 16 comprises a RAM 13, a CPU 14, and a ROM 15. In accordance with shipment information 17 inputted via the I/O port 12, a stowage program stored in the computer 16 of the control device 9 determines the kinds (from among the first through fourth kinds in the case illustrated in FIG. 1), the numbers of respective kinds, and the stowing order of the workpieces stowed on each particular pallet 8.

The flow of the stowage operation is shown in detail in FIG. 3. As described above, the first through fourth carrier means 2 through 5 carried on the supply means 1 accommodate workpieces of first through fourth kinds respectively. Further, an empty pallet 8 is transferred near to the robot 6 beforehand. The stowage is effected via a stowage program of the control device 9 in accordance with the shipment information inputted to the control device 9 at step 101. In summary, the stowage program effects the stowage as follows: During a first stowing cycle, a number of workpieces of each particular kind which fill up one layer (i.e., a stratum or level) of workpieces on the pallet 8 (or two or more integral layers or strata of the workpieces) are stowed on the pallet 8. The remaining fraction of workpieces of the kinds which are to be stowed on the pallet 8 according to the shipment information but which have not been stowed on the pallet during the first cycle are stowed during a second or re-stowing cycle. In FIG. 3, the first stowing cycle comprises steps 103 through 109, and the second or re-stowing cycle comprises steps 110 through 118.

Thus, at step 102, the variable A representing the kinds (kind) of the workpiece is initialized to 1 (A=a). Thus, in the first execution of the steps 103 through 108 described below, the kinds variable A is equal to 1. At step 103, the kinds A supply command is issued from the supply command device 11 to activate the supply means 1, and at step 104 a kinds A carrier means corresponding (i.e., forwarding) command is issued such that the carrier means (the first carrier means 2 in the first execution after the initialization at step 102, since the kinds variable A is equal to 1 at the first execution) accommodating the workpieces of kinds A is forwarded to the robot 6. Further, at step 105, a kinds A stowage command is issued from the stowage command device 10, such that the robot 6 is activated to pick up the workpieces of kinds A from the carrier means and stow them on the pallet 8 at step 106. At step 107, it is judged whether the stowing of the workpieces of kinds A in the first stowing cycle is complete or not. If it is not yet complete, the stowing of the workpieces of kinds A is repeated at step 106. When the stowing of a predetermined number of workpieces of kinds A filling one or more complete layers or strata of workpieces is complete, the execution proceeds to step 108, where it is judged whether the kinds variable A has reached a value B (the value B may be equal to 4 in the case illustrated in FIG. 1) commanded by the control device 9. If the kinds variable A has not yet reached B, A is incremented by 1 at step 109, and the steps 103 through 108 are repeated for the new incremented value of A. During the first stowing cycle at steps 103 through 107, the carrier means 2 through 5 may be transferred to the refuge conveyor 1b at step 103, as illustrated by the first carrier means 2 shown by dot-and-dash lines in FIG. 1, the carrier means necessary for the stowage being transferred to a predetermined position with respect to the robot 6 in response to the kinds A carrier means corresponding command at step 104.

When the variable A finally reaches B at step 108 (and thus the first stowing cycle is complete), the variable C representing the kinds of workpieces for the re-stowing cycle is set to 1 at step 110 before starting the re-stowing cycle. Thereafter, at step 111, it is judged whether a re-stowage command for the workpieces of kinds C is issued or not. A re-stowage command for kinds C is issued when there remain a fraction of workpieces of kinds C which are yet to be stowed on the pallet 8 after the first stowing cycle steps 102 through 108. When the re-stowage command for kinds C is issued at step 111, a supply command for kinds C is issued at step 112 to activate the supply means 1. When a carrier means 2 accommodating workpieces of kinds C is on the refuge conveyor 1b, the carrier means 2 is transferred to a predetermined position with respect to the robot 6 in response to the kinds C carrier means corresponding command at step 113. Further, at step 114, a kind C re-stowage command is issued from the stowage command device 10, such that, at step 115, the robot 6 is activated to pick up the remaining fraction at workpieces of kinds C from the carrier means and stow them on top of the workpieces already stowed on the pallet 8. At step 116, it is judged whether the re-stowing of the workpieces of kinds C is complete or not. If it is not yet complete, the re-stowing of the workpieces of kinds C is repeated at step 115. When the re-stowing of workpieces of kinds C is complete, the execution proceeds to step 117, where it is judged whether the kinds variable C for the re-stowing cycle has reached a value D (which may be equal to 4 in the case illustrated in FIG. 1) commanded by the control device 9. If the kinds variable C has not yet reached D, the variable C is incremented by 1 at step 118, and the steps 111 through 117 are repeated for the new incremented value of C. When the kinds variable C reaches the predetermined value D at step 117, the re-stowing of the fraction workpieces is terminated, and the pallet 8 carrying predetermined number of workpieces of respective kinds in accordance with the shipment information is forwarded to a shipment yard (not shown) via the discharge mechanism 7a. By the way, the carrier means from which a predetermined number of workpieces is picked up and stowed on the pallet 8 are discharged via the discharge conveyor 1c. The carrier means are loaded with new workpieces and forwarded again via the supply means 1.

Figure 4:
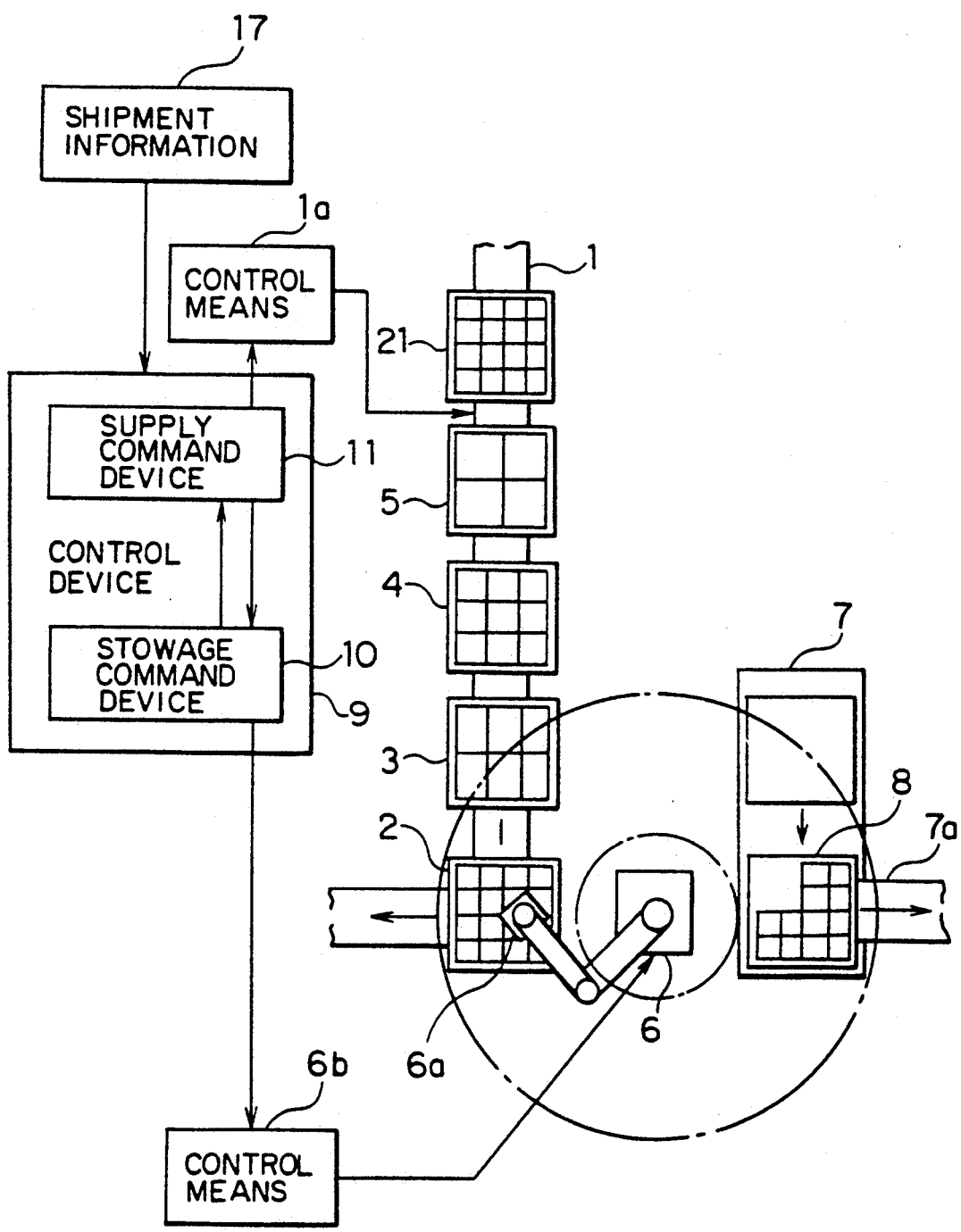
FIG. 4 is a diagram similar to that of FIG. 1, but showing the organization of another stowage device according to this invention.

FIG. 4 shows a stowage device according to another embodiment of this invention. In the case of this embodiment, the supply means 1 consists of a circulation type conveyor, by which the carrier means 2 through 5 and backup carrier means (first backup carrier means 21 for the workpieces of the first kinds is shown in FIG. 4) are circulated. Thus, by means of the circulation of the carrier means on the supply means 1, the workpieces of respective kinds can be supplied to the robot 6 when they are needed. For example, when workpieces of the first kinds is needed in the re-stowing cycle, either the first carrier means 2 or the first backup carrier means 21, either one accommodating the workpieces of the first kinds, is supplied to the robot 6 via the supply means 1. A refuge conveyor 1b of the supply means 1 of FIG. 1 is not necessary and thus can be dispensed with. Otherwise, the organization and method of operation of the stowage device of FIG. 4 is similar to that of the first embodiment described above. The backup carrier means may be provided for all or a particular one(s) of the carrier means 2 through 5.

What is claimed is:

1. A stowage device for receiving a plurality of carriers, each carrier carrying a plurality of articles of one respective kind, and for stowing articles of a plurality of kinds on a pallet in accordance with shipment information, the stowage device comprising:

transfer means for forwarding a pallet to and taking a pallet away from a loading position;

an industrial robot having an operational range for picking articles from the carriers and for stowing the articles on a pallet forwarded by said transfer means to loading position;

a main conveyor for forwarding the carriers to an unloading position in the operational range of said robot;

a refuge track conveyor connected to said main conveyor for supporting a plurality of carriers within the operational range of the robot;

a stowage command device connected to and commanding said industrial robot to stow articles on the pallet at the loading position;

a supply command device connected to and commanding said main conveyor to forward respective carriers to the unloading position;

information input means for receiving shipment information specifying different kinds of articles to be stowed on the pallet at the loading position, numbers of articles of each respective kind, and a stowing order for the articles to be stowed on the pallet; and control means for receiving the shipment information from said information input means and controlling said supply command device and said stowage command device according to the shipment information in a first cycle so that different specified kinds of articles are loaded on the pallet to form homogeneous layers on the pallet with only articles of a single kind being stowed within each layer and for controlling said supply command device and the stowage command device according to said shipment information in a second re-stowing cycle such that remaining articles specified by the shipment information are transferred from a carrier on said refuge track conveyor and stowed on the pallet on top of the articles of different kinds stowed in stable homogeneous layers during the first stowing cycle.

2. A stowage device for transferring articles from a plurality of carriers, each carrier carrying a plurality of articles of one respective kin, onto a pallet, the stowage device comprising:

a circulating conveyor for transporting the plurality of carriers along a circulating path;

transfer means for forwarding a pallet to and taking a pallet away from a loading position;

an industrial robot having an operational range for picking articles from the carriers and for stowing the articles on the pallet forwarded by said transfer means to the loading position; and a controller comprising:

means or controlling said conveyor to more a first carrier carrying a plurality of articles of a first kind to an unloading position in the operational range of said robot;

means or controlling said robot to transfer articles of the first kind from the first carrier to the pallet to form a first complete layer on the pallet;

means for controlling said conveyor to move a second carrier carrying a plurality of articles of a second kind to the unloading position after formation of the firs layer;

means for controlling said robot to transfer articles of the second kind from the second carrier to the pallet to form a second complete layer on top of the first layer;

means for controlling said conveyor to circulate the first and second carriers along the path to return the first carrier to the unloading position after formation of the second layer; and means for controlling said robot to transfer articles of the first kind from the first carrier to on top of the second layer.

3. A stowage device comprising:

an industrial robot including a movable arm having an operational range;

a main conveyor extending to an unloading position in the operational range of the arm;

a plurality of carriers movably supported by the main conveyor, each of the carriers carrying a plurality of articles of a single kind, different carriers carrying different kinds of the articles;

a refuge track conveyor connected to the main conveyor and lying in the operational range of the robot arm and sufficiently long to support a plurality of the carriers;

a loading pallet disposed in the operational range of the robot arm; and a controller comprising:

means for controlling the main conveyor to move a first one of the carriers carrying a plurality of articles of a first kind to the unloading position;

means for controlling the robot to transfer articles of the first kind from the first carrier to the pallet to form a first complete layer on the pallet;

means for controlling the main conveyor to move the first carrier from the unloading position onto the refuge track conveyor and move a second of the carriers carrying a plurality of articles of a second kind to the unloading position after formation of the first complete layer;

means for controlling the robot to transfer articles of the second kind from the second carrier to the pallet to form a second complete layer on top of the firs complete layer; and means for controlling the robot to transfer additional articles of the first kind from the first carrier situated on the refuge track conveyor to on top of the second layer.

4. A stowage device as claimed in claim 3 wherein the operational range has an outer periphery bounded by a first circle and the refuge track extends along an arc of a second circle concentric with the first circle.

* * * * *

UNITED STATES PATENT AND TRADEMARK OFFICE
CERTIFICATE OF CORRECTION

PATENT NO. : 5,281,081
DATED : January 25, 1994
INVENTOR(S) : Hisao Kato

It is certified that error appears in the above-indentified patent and that said Letters Patent is hereby corrected as shown below:

Col. 5, line 67, change "kin" to --kind--.
Col. 6, line 10, change "or" to --for--.
Col. 6, line 14, change "or" to --for--.
Col. 6, line 20, change "firs" to --first--.
Col. 6, line 59, change "firs" to --first--.

Signed and Sealed this

Second Day of August, 1994

Attest:

BRUCE LEHMAN

*Attesting Officer*           Commissioner of Patents and Trademarks